(12) United States Patent
Hwang et al.

(10) Patent No.: US 12,742,881 B2
(45) Date of Patent: Sep. 22, 2026

(54) METHOD AND DEVICE FOR DETECTING TARGET OBJECT USING LASER

(71) Applicant: ELECTRONICS AND TELECOMMUNICATIONS RESEARCH INSTITUTE, Daejeon (KR)

(72) Inventors: Jung Hwan Hwang, Daejeon (KR); Jong Hwa Kwon, Daejeon (KR); Chang Hee Hyoung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 944 days.

(21) Appl. No.: 18/086,834

(22) Filed: Dec. 22, 2022

(65) Prior Publication Data

US 2024/0004067 A1 Jan. 4, 2024

(30) Foreign Application Priority Data

Jul. 1, 2022 (KR) ........................ 10-2022-0081085

(51) Int. Cl.
*G01S 17/04* (2020.01)
*G01S 7/481* (2006.01)

(52) U.S. Cl.
CPC ............ *G01S 17/04* (2020.01); *G01S 7/4816* (2013.01); *G01S 7/4817* (2013.01)

(58) Field of Classification Search
CPC ...... G01S 17/04; G01S 7/4816; G01S 7/4817; G01S 7/4811; G02B 1/10; G02B 5/08; G02B 7/1821; G02B 2003/0093; G01J 2001/4446; H10F 30/21
See application file for complete search history.

(56) References Cited

U.S. PATENT DOCUMENTS 9,352,690 B2 5/2016 Choi et al.
10,061,019 B1 * 8/2018 Campbell ............... G01S 17/42
2006/0131486 A1 * 6/2006 Land ....................... G01S 17/89 250/221
2011/0036908 A1 2/2011 Havens et al.
2012/0136510 A1 5/2012 Min et al.
2013/0215271 A1 * 8/2013 Lu ........................... B60R 11/04 348/148

(Continued)

FOREIGN PATENT DOCUMENTS

JP 2013-195302 A 9/2013
JP 2013254025 A * 12/2013
KR 10-1699250 B1 1/2017

(Continued)

*Primary Examiner* — Isam A Alsomiri
*Assistant Examiner* — Benjamin Wade Clouser
(74) *Attorney, Agent, or Firm* — LRK PATENT LAW FIRM

(57) ABSTRACT

A method and a device for detecting an object using a laser are provided. A laser scanner for detecting an object using a laser includes a transmitter configured to transmit a first laser, a receiver configured to receive a second laser reflected by the target object, and a reflector including a lens configured to reflect the first laser and to irradiate the first laser to the target object and to reflect the second laser to the receiver, and a mirror having a shape of a horn.

16 Claims, 7 Drawing Sheets

(56) References Cited

U.S. PATENT DOCUMENTS

2020/0003872 A1* 1/2020 Kim ........................ G01S 17/42

FOREIGN PATENT DOCUMENTS

KR 101867967 B1 * 6/2018 ........... H01S 3/0071
KR 10-2020-0003541 A 1/2020
KR 10-2105715 B1 4/2020
KR 10-2189595 B1 12/2020

* cited by examiner

METHOD AND DEVICE FOR DETECTING TARGET OBJECT USING LASER

CROSS-REFERENCE TO RELATED APPLICATION

This application claims the benefit of Korean Patent Application No. 10-2022-0081085 filed on Jul. 1, 2022, in the Korean Intellectual Property Office, the entire disclosure of which is incorporated herein by reference for all purposes.

BACKGROUND

1. Field of the Invention

One or more embodiments relate to a method and a device for detecting a target object using a laser.

2. Description of Related Art

A laser scanner may detect a target object by transmitting a laser to the target object and receiving the laser reflected by the target object. The laser scanner may include a laser transmitter, a laser receiver, and a laser reflector. The transmitter may transmit a laser using a photodiode. The receiver may receive a laser reflected by the target object using a photodetector. The laser reflector may reflect a laser transmitted from the transmitter and irradiate the laser to the target object and reflect the laser reflected by the target object back to the receiver. The laser scanner may measure time from when the laser is transmitted from the transmitter to when the laser is reflected by the target object and received by the receiver. Using the measured time, the laser scanner may calculate a distance from the laser scanner (e.g., the transmitter included in the laser scanner) to the target object (e.g., a surface of the target object) and determine a shape of the target object (e.g., a surface shape of the target object).

The laser scanner (e.g., a two-dimensional (2D) laser scanner) may check a shape of a 2D plane by irradiating a laser curtain to the target object and receiving a reflected laser. The laser scanner may also be used as an obstacle detection sensor. For example, the laser scanner may detect an obstacle by irradiating the laser curtain to the target object through the transmitter and receiving the reflected laser through the receiver.

SUMMARY

An electromagnetic wave (e.g., a fifth generation (5G) mobile communication electromagnetic wave having a directivity characteristic) may be radiated in a certain direction. The electromagnetic wave propagating in a certain direction may have a high-power density. A laser scanner may receive a laser reflected by a target object and the electromagnetic wave. The electromagnetic wave having high power density may cause an operation error (e.g., a target object detection error) of the laser scanner.

According to various embodiments, the present disclosure may reduce the operation error of the laser scanner due to interference of a high-frequency electromagnetic wave by reflecting a laser through a reflector including a lens and a horn-shaped mirror.

However, the technical aspects are not limited to the aspects above, and there may be other technical aspects.

According to an aspect, there is provided a laser scanner for detecting a target object using a laser including a transmitter configured to transmit a first laser, a receiver configured to receive a second laser reflected by the target object, and a reflector including a lens and a horn-shaped mirror configured to reflect the first laser and to irradiate the first laser to the target object and to reflect the second laser to the receiver.

The lens may be formed along an inclined surface of an edge of the mirror and have a cylindrical shape.

The lens may have a convex cross-section.

A surface except for a partial surface of an outer surface of the lens may be coated with a material impervious to laser transmission.

The mirror may include a horn-shaped mirror.

The reflector may further include a shaft connected to a bottom surface of the mirror.

The reflector may be configured to rotate with the shaft as a rotation shaft so that the first laser is irradiated to the target object by passing through the partial surface.

The receiver may include a photodetector.

The photodetector may include a p-type semiconductor and an n-type semiconductor.

The receiver may be configured to detect the target object using a built-in potential barrier formed at a p-n junction between the p-type semiconductor and the n-type semiconductor.

According to an aspect, there is provided a method of detecting a target object using a laser including transmitting a first laser, reflecting the first laser using a reflector including a lens and a horn-shaped mirror so that the first laser is irradiated to the target object, reflecting a second laser reflected by the target object using the reflector, and receiving the second laser.

The lens may be formed along an inclined surface of an edge of the mirror and have a cylindrical shape.

The lens may have a convex cross-section.

A surface except for a partial surface of an outer surface of the lens may be coated with a material impervious to laser transmission.

The lens may include a horn-shaped mirror.

The method may further include rotating the reflector so that the first laser is irradiated to the target object by passing through the partial surface.

The receiving of the second laser may include receiving a laser reflected by the target object using a photodetector.

The photodetector may include a p-type semiconductor and an n-type semiconductor.

The receiving of the laser reflected by the target object using the photodetector may include detecting the target object using a built-in potential barrier formed at a p-n junction between the p-type semiconductor and the n-type semiconductor.

According to an aspect, there is provided a system of detecting an object using a laser including a laser scanner according to an embodiment and a controller, and the controller includes a memory configured to store instructions and a processor electrically connected to the memory and configured to execute the instructions, and when the instructions are executed by the processor, the processor is configured to control the laser scanner.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
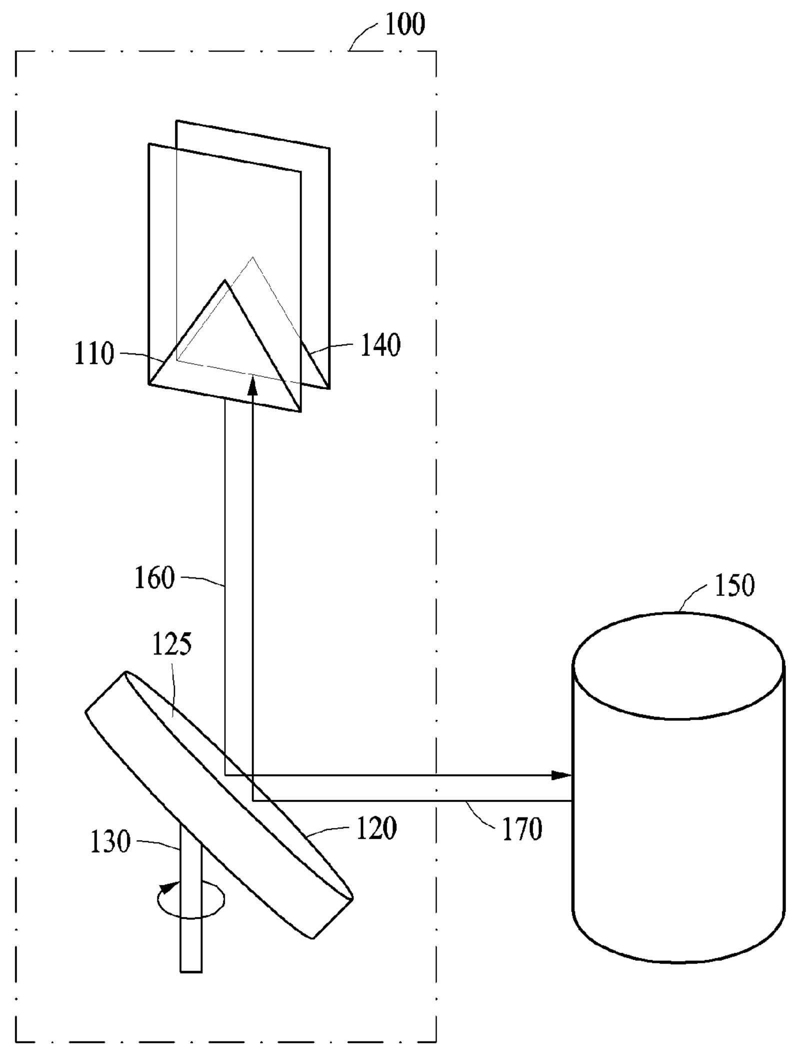
FIG. 1 is a diagram illustrating an example of a laser scanner according to an embodiment.

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as "first", "second", and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example, the module may be implemented in a form of an application-specific integrated circuit (ASIC).

Hereinafter, the examples will be described in detail with reference to the accompanying drawings. When describing the embodiments with reference to the accompanying drawings, like reference numerals refer to like elements and any repeated description related thereto will be omitted.

FIG. 1 is a diagram illustrating an example of a laser scanner.

Referring to FIG. 1, a laser scanner 100 may include a transmitter 110, a reflector 120, a shaft 130, and a receiver 140.

The transmitter 110 may transmit a laser 160. The transmitter 110 may include a photodiode but is not limited thereto.

One surface (hereinafter referred to as a reflective surface 125) of the reflector 120 may be formed of a mirror (e.g., a metal having high reflectivity). The reflector 120 may be installed so that an angle between the reflective surface 125 and the laser 160 incident on the reflector from the transmitter 110 is 90 degrees)(° or less. For example, the reflector 120 may be installed so that an angle between the reflective surface 125 and the laser 160 is 45°. The reflector 120 may reflect the laser 160 transmitted from the transmitter 110 to a target object 150. The reflector 120 may reflect a laser 170 reflected by the target object 150 to the receiver 140. The proceeding direction of the lasers 160 and 170 may be changed by the reflector 120. For example, the lasers 160 and 170 may be reflected by the reflector 120 and the proceeding direction may be changed from a horizontal direction to a vertical direction or from a vertical direction to a horizontal direction. The reflector 120 may reflect the laser 160 so that the laser scanner 100 scans a surface (e.g., a two-dimensional (2D) surface) of the target object 150.

The shaft 130 may be connected to one surface (e.g., a bottom surface) of the reflector 120. The shaft 130 may serve as a rotation shaft for rotating the reflector 120. As the reflector 120 rotates with the shaft 130 as a rotation shaft, the laser 160 may form a laser curtain. For example, the laser 160 forms a cylindrical laser curtain as the shaft 130 rotates the reflector 120, so that a 2D plane may be scanned using one transmitter 110. The receiver 140 may receive the laser reflected by the target object 150 from the reflector 120.

Figure 2A:
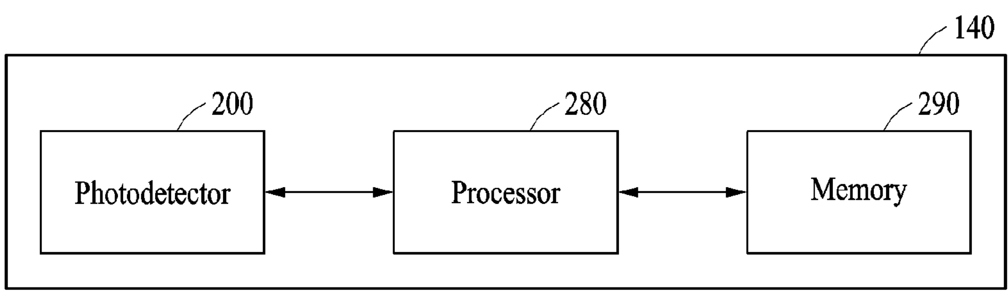
FIG. 2A is a block diagram schematically illustrating a laser receiver according to an embodiment.
Figure 2B:
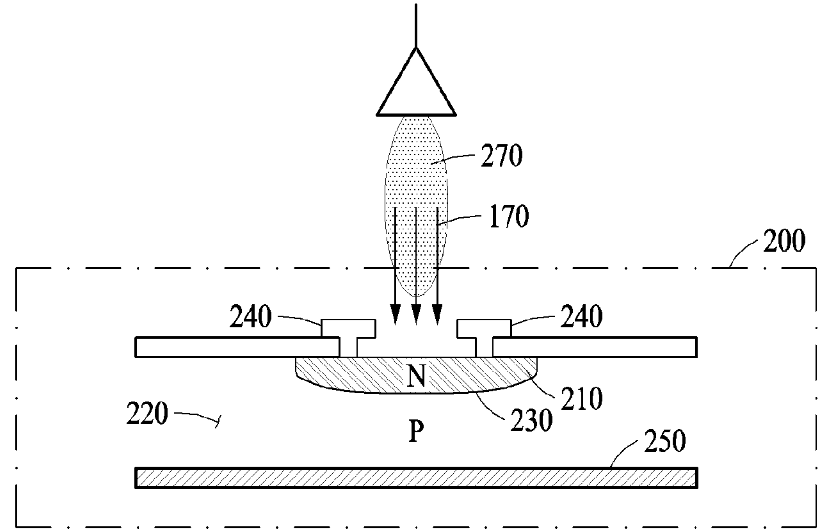
FIG. 2B is a diagram illustrating an example of a photodetector included in a laser receiver according to an embodiment.

FIG. 2A is a block diagram schematically illustrating a laser receiver. FIG. 2B is a diagram illustrating an example of a photodetector included in a laser receiver.

Referring to FIGS. 2A and 2B, the receiver 140 may include a photodetector 200, a processor 280, and a memory 290.

The photodetector 200 may be manufactured through a semiconductor process. The photodetector 200 may include an n-type semiconductor 210, a p-type semiconductor 220, and electrodes 240 and 250. A p-n junction 230 may be formed between the p-type semiconductor 220 and the n-type semiconductor 210. A reverse bias may be applied between the electrodes 240 and 250. That is, a positive voltage may be applied to the n-type semiconductor 210 and a negative voltage may be applied to the p-type semiconductor 220. A built-in potential barrier formed at the p-n junction 230 may increase due to the reverse bias. When the built-in potential barrier increases, a current may not flow through the p-n junction 230. The built-in potential barrier may be reduced by the laser 170 received by the receiver 140. For example, when the laser 170 is incident on the p-n junction 230, energy is supplied to the p-n junction 230, so the built-in potential barrier may be reduced. When the built-in potential barrier is reduced, a current may flow through the p-n junction 230.

The memory 290 may store instructions (or programs) executable by the processor 280. For example, the instructions may include instructions for performing an operation of the processor 280 and/or an operation of each component of the processor 280.

The processor 280 may process data stored in the memory 290. The processor 280 may execute computer-readable code (e.g., software) stored in the memory 290 and instructions triggered by the processor 280.

The processor 280 may be a hardware-implemented data processing device having a circuit that is physically structured to execute desired operations. For example, the desired operations may include code or instructions included in a program.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 280 may determine whether the laser 170 is received using a current (e.g., a current flowing through the p-n junction 230) and detect the target object 150 (or an obstacle). When an electromagnetic wave 270 (e.g., a high-frequency electromagnetic wave such as a 5G communication electromagnetic wave) unrelated to a laser (e.g., the laser 160 of FIG. 1) is incident on the photodetector 200, the processor 280 may malfunction (e.g., a target object detection error). For example, when the electromagnetic wave 270 is reflected by a reflector (e.g., the reflector 120 of FIG. 1) and is incident on the photodetector 200, energy is supplied to the p-n junction 230, so the built-in potential barrier may be reduced. As the built-in potential barrier is reduced, a current may flow through the p-n junction 230 and the processor 280 may malfunction.

Figure 3:
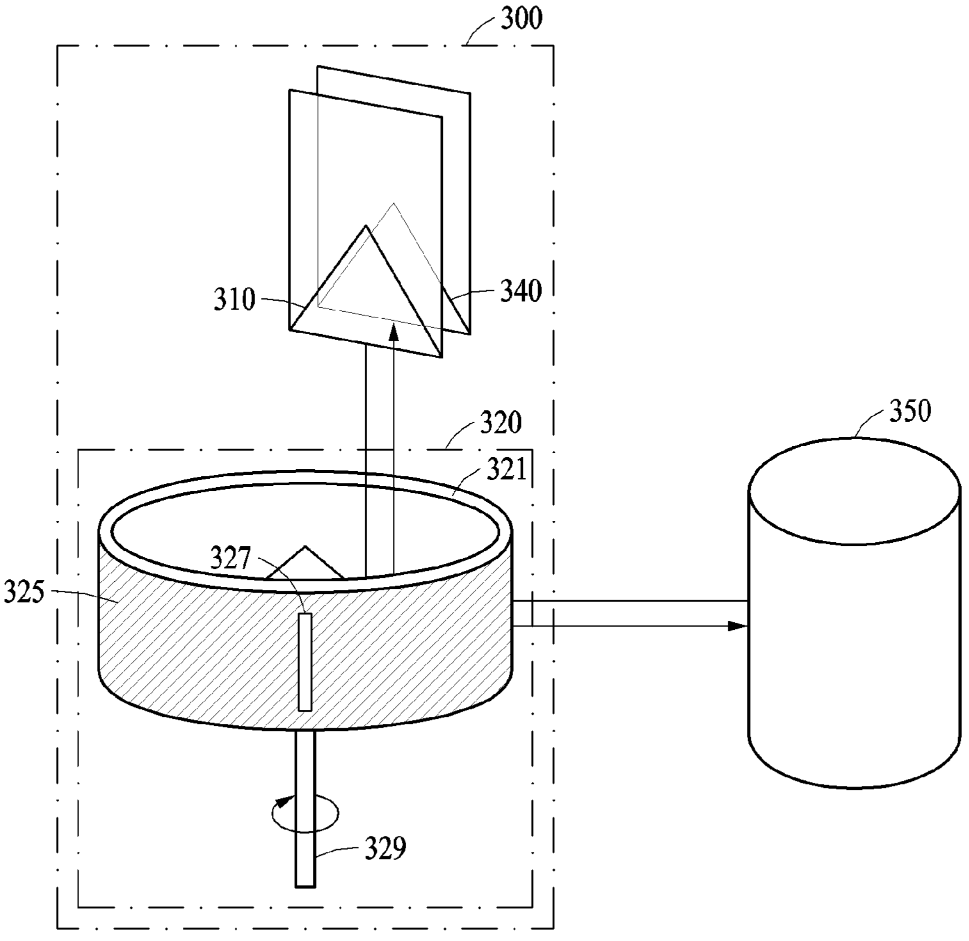
FIG. 3 is a diagram illustrating a structure of a laser scanner according to an embodiment.

FIG. 3 is a diagram illustrating a structure of a laser scanner according to various embodiments.

Referring to FIG. 3, according to various embodiments, a laser scanner 300 may include a transmitter 310, a reflector 320, and a receiver 340. The transmitter 310 may be substantially the same as the transmitter 110 of FIG. 1. The receiver 340 may be substantially the same as the receiver 140 of FIG. 1. Accordingly, further descriptions of the transmitter 310 and the receiver 340 are not repeated herein and a structure of the reflector 320 will be described in detail with reference to FIG. 4.

Figure 4:
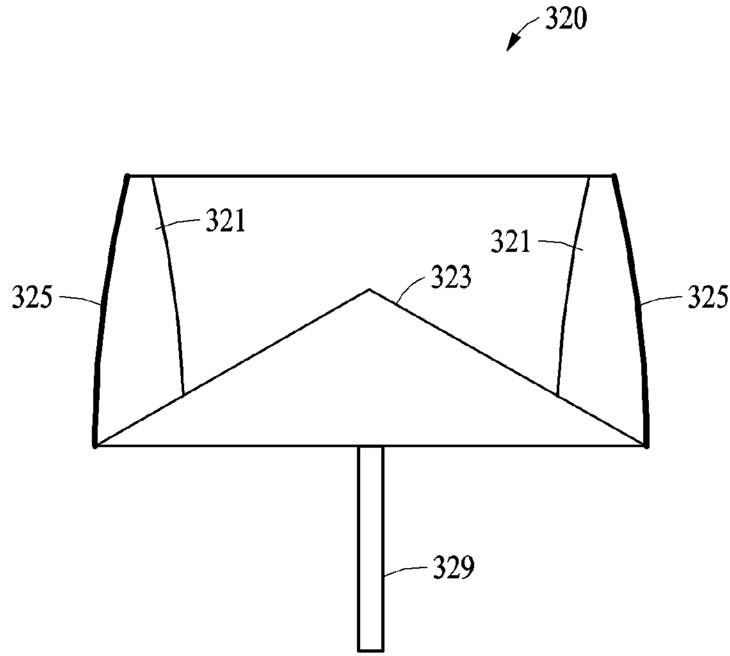
FIG. 4 is a cross-sectional view illustrating a structure of a reflector according to an embodiment.

FIG. 4 is a cross-sectional view illustrating a structure of a reflector according to various embodiments.

Referring to FIG. 4, according to various embodiments, the reflector 320 may include a mirror 323, a lens 321, and a shaft 329.

The mirror 323 may have a horn shape (e.g., a circular cone) having a triangular cross-section. The mirror 323 may be manufactured by coating a surface of a horn-shaped object (e.g., a plastic target object) with a highly reflective material (e.g., metal).

The lens 321 may have a cylindrical shape with a convex cross-section. For example, the lens 321 may be the lens 321 having a convex cross-section whose thickness decreases from the lower part to the upper part of the lens 321. That is, the cross-sectional shape of the lens 321 may be the same as half of a convex lens. The lens 321 may be formed along an inclined surface of an edge of the mirror 323. A surface 325 except for a partial surface (e.g., a partial surface 327 of FIG. 3) among an outer surface of the lens 321 may include a material (e.g., metal) impervious to laser transmission. For example, the surface 325 may be coated with a material impervious to laser transmission. The partial surface 327 may serve as a light receiving slot. The light receiving slot may pass lasers (e.g., lasers 510 to 530 of FIG. 5). An inner surface of the lens 321 may be uncoated. The lens 321 may be manufactured by producing a cylindrical crystal with an open top surface and a bottom surface by removing the center of the crystal cylinder, and then processing the cross-section to be convex. However, the material and manufacturing method of the lens 321 are not limited thereto.

The shaft 329 may serve as a rotation shaft for rotating the reflector 320. As the shaft 329 rotates the reflector 320, a laser transmitted from the transmitter (e.g., the transmitter 310 of FIGS. 3 and 5) may pass through the partial surface 327 and be irradiated to the target object 350. The shaft 329 may be vertically connected to the lower surface of the mirror 321.

Figure 5:
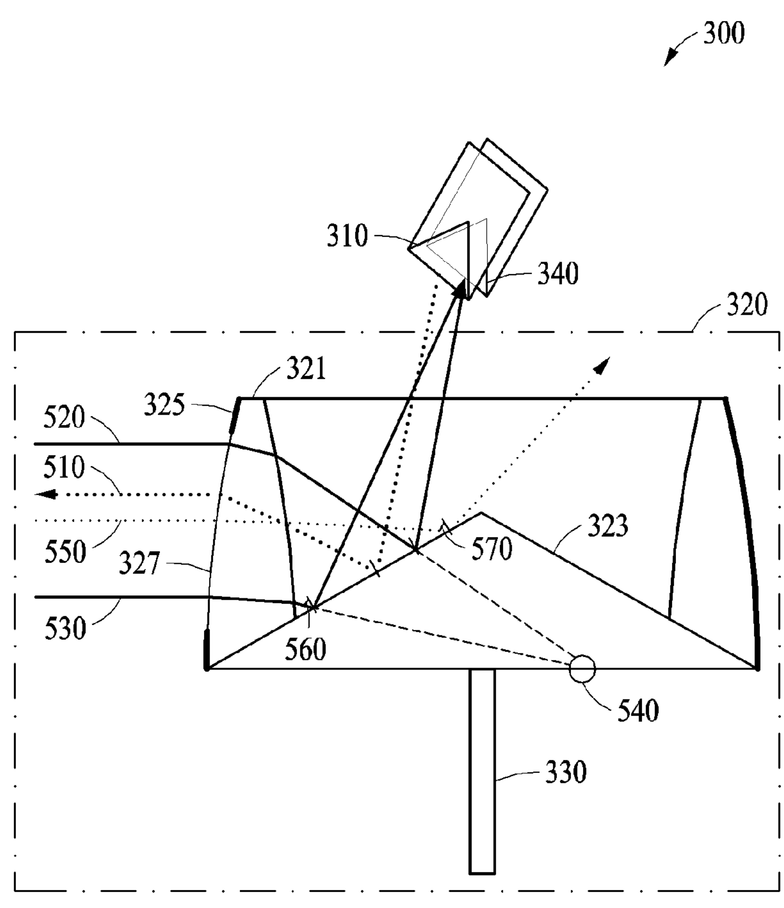
FIG. 5 is a diagram illustrating a method of detecting a target object using a laser according to an embodiment.

FIG. 5 is a diagram illustrating a method of detecting a target object using a laser according to various embodiments.

Referring to FIG. 5, according to various embodiments, when the cross-sectional thickness of the lens 321 is not constant, each part of the lens 321 may have a different refractive index. For example, the refractive index of the lens 321 may increase from the lower part to the upper part of the lens 321.

A laser 510 (hereinafter referred to as a first laser) transmitted from the transmitter 310 may be reflected by the mirror 323 and pass through the partial surface 327 of the lens 321. The first laser 510 may proceed in a horizontal direction, that is, in a direction perpendicular to the shaft 330. When the first laser 510 is irradiated to a target object (e.g., the target object 350 of FIG. 3), the first laser 510 may be reflected by the target object 350. Lasers 520 and 530 (hereinafter referred to as second lasers) reflected by the target object 350 may pass through the partial surface 327 of the lens 321. For example, the second lasers 520 and 530 may be incident on the partial surface 327 of the lens 321 in a horizontal direction, that is, in a direction perpendicular to the shaft 330, and pass through the lens 321. The second lasers 520 and 530 may be refracted toward a focus 540 of the lens 321. The second lasers 520 and 530 may be reflected by the mirror 323 and be incident on the receiver 340. The mirror 323 may be manufactured with an appropriate inclination so that the second lasers 520 and 530 may be incident on the receiver 340. Similarly, the lens 321 may be manufactured with an appropriate thickness so that the second lasers 520 and 530 may be incident on the receiver 340.

An electromagnetic wave 550 (e.g., a high-frequency electromagnetic wave such as a 5g communication electromagnetic wave) may have a longer wavelength than the lasers 510 to 530. Accordingly, when the electromagnetic wave 550 passes through the lens 321, it may be refracted less than that of the lasers 510 to 530. An incident angle 570 of the electromagnetic wave 550 to the lens 321 (specifically, a surface of the lens 321) may be greater than an incident angle 560 of the second lasers 520 and 530. As a result, the electromagnetic wave 550 may not be incident on the receiver 340.

According to various embodiments, since the lasers 510 to 530 may pass only through the partial surface 327 of the lens 321, the laser scanner 300 may detect a direction in which the target object 350 exists.

According to various embodiments, the laser scanner 300 may receive less interference from the electromagnetic wave 550 by using a reflector including the lens 321 and the horn-shaped mirror 323.

Figure 6:
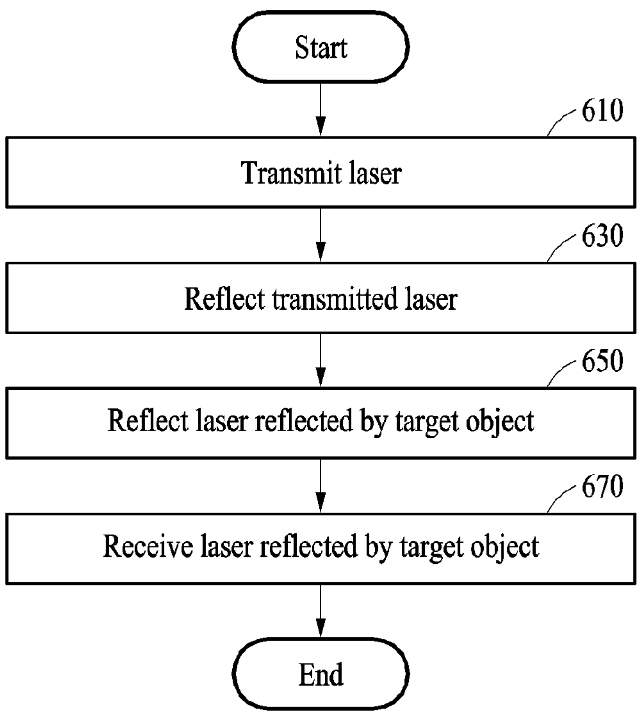
FIG. 6 is a flowchart illustrating a method of detecting a target object using a laser according to an embodiment.

FIG. 6 is a flowchart illustrating a method of detecting a target object using a laser according to various embodiments.

Referring to FIG. 6, according to various embodiments, the flow of operation shown in FIG. 6 is an example illustrating a method of detecting a target object using a laser, but is not limited thereto, and two or more operations may be performed in parallel.

In operation 610, a laser scanner (e.g., the laser scanner 300 of FIGS. 3 and 5) may transmit a first laser (e.g., the first laser 510 of FIG. 5).

In operation 630, the laser scanner 300 may reflect the first laser 510 so that the first laser 510 is irradiated to a target object (e.g., the target object 350 of FIG. 3). The laser scanner 300 may reflect the first laser 510 using a reflector (e.g., the reflector 320 of FIGS. 3 to 5) including a lens (e.g., the lens 321 of FIGS. 3 to 5) and a mirror (e.g., the mirror 323 of FIGS. 4 and 5). The laser scanner 300 may rotate the reflector 320 so that the first laser 510 may pass through an uncoated partial surface (e.g., the partial surface 327 in FIGS. 3 and 5) of the lens 321 and be irradiated to the target object 350.

In operation 650, the laser scanner 300 may reflect the second laser (e.g., the second lasers 520 and 530 of FIG. 5) reflected by a target object using the reflector 320.

In operation 670, the laser scanner 300 may receive the second lasers 520 and 530. The laser scanner 300 may use a photodetector (e.g., the photodetector 200 including the p-type semiconductor 220 and the n-type semiconductor 210 of FIG. 2B). For example, the photodetector 200 may detect the target object 350 using a built-in potential barrier formed at a p-n junction (e.g., the p-n junction 230 in FIG. 2B) between the p-type semiconductor 220 and the n-type semiconductor 210.

Figure 7:
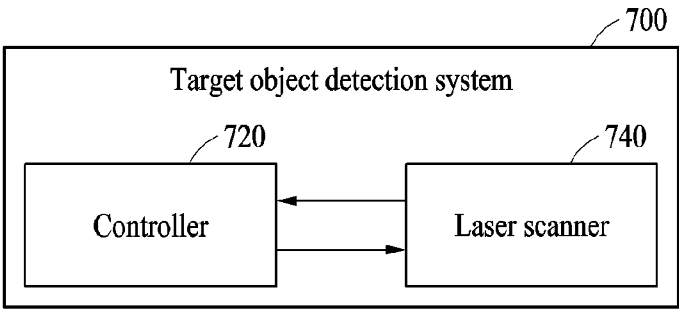
FIG. 7 is a block diagram schematically illustrating a system of detecting a target object using a laser according to an embodiment.

FIG. 7 is a block diagram schematically illustrating a system of detecting a target object using a laser according to various embodiments.

Referring to FIG. 7, according to various embodiments, a target object detection system 700 may include a controller 720 and a laser scanner 740. The laser scanner 740 may be substantially the same as the laser scanner 300 described with reference to FIGS. 3 to 5. Accordingly, further description thereof is not repeated herein.

The controller 720 may control the laser scanner 740. For example, the controller 720 may control a scanning period of the laser scanner 740.

Figure 8:
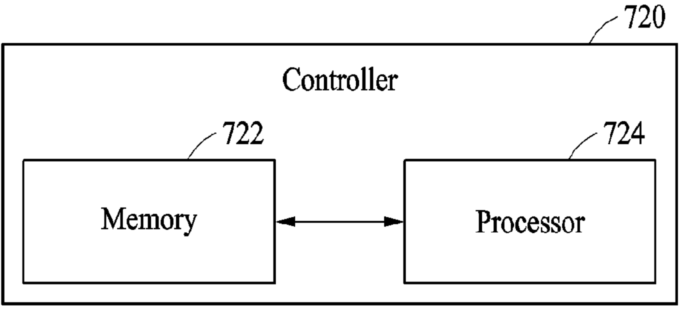
FIG. 8 is a block diagram schematically illustrating a controller for controlling a laser scanner according to an embodiment.

FIG. 8 is a block diagram schematically illustrating the controller of FIG. 7 according to various embodiments.

Referring to FIG. 8, according to various embodiments, the controller 720 may include a memory 722 and a processor 724.

The memory 722 may store instructions (or programs) executable by the processor 724. For example, the instructions may include instructions for performing an operation of the processor 724 and/or an operation of each component of the processor 724.

The processor 724 may process data stored in the memory 722. The processor 724 may execute computer-readable code (e.g., software) stored in the memory 722 and instructions triggered by the processor 724.

The processor 724 may be a hardware-implemented data processing device having a circuit that is physically structured to execute desired operations. For example, the desired operations may include code or instructions included in a program.

For example, the hardware-implemented data processing device may include a microprocessor, a CPU, a processor core, a multi-core processor, a multiprocessor, an ASIC, and a FPGA.

An operation performed by the processor 724 may be substantially the same as an operation of the controller 720 described with reference to FIG. 7. Accordingly, further description thereof is not repeated herein.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component and/or a combination thereof. A processing device may be implemented using one or more of general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A laser scanner for detecting a target object using a laser beam, the laser scanner comprising:

a transmitter configured to transmit a first laser beam;

a receiver configured to receive a second laser beam reflected by the target object; and a reflector comprising a lens and a horn-shaped mirror configured to reflect the first laser beam and to irradiate the first laser beam to the target object and to reflect the second laser beam to the receiver, wherein the lens is formed along an inclined surface of an edge of the horn-shaped mirror and has a convex cylindrical cross-section whose thickness decreases from a lower part to an upper part of the lens, wherein each part of the lens has a different refractive index.

2. The laser scanner of claim 1, wherein a surface except for a partial surface of an outer surface of the lens is coated with a material impervious to laser transmission.

3. The laser scanner of claim 2, wherein the mirror comprises a horn-shaped mirror.

4. The laser scanner of claim 3, wherein the reflector further comprises a shaft connected to a bottom surface of the mirror.

5. The laser scanner of claim 4, wherein the reflector is configured to rotate with the shaft as a rotation shaft so that the first laser is irradiated to the target object by passing through the partial surface.

6. The laser scanner of claim 1, wherein the receiver comprises a photodetector.

7. The laser scanner of claim 6, wherein the photodetector comprises a p-type semiconductor and an n-type semiconductor.

8. The laser scanner of claim 7, wherein the receiver is configured to detect the target object using a built-in potential barrier formed at a p-n junction between the p-type semiconductor and the n-type semiconductor.

9. A method of detecting a target object using a laser beam, the method comprising:

transmitting a first laser beam;

reflecting the first laser beam using a reflector comprising a lens and a horn-shaped mirror so that the first laser is irradiated to the target object;

reflecting a second laser beam reflected by the target object using the reflector; and receiving the second laser beam, wherein the lens is formed along an inclined surface of an edge of the horn-shaped mirror and has a convex cylindrical cross-section whose thickness decreases from a lower part to an upper part of the lens, wherein each part of the lens has a different refractive index.

10. The method of claim 9, wherein a surface except for a partial surface of an outer surface of the lens is coated with a material impervious to laser transmission.

11. The method of claim 10, wherein the mirror lens comprises a horn-shaped mirror.

12. The method of claim 11, further comprising:

rotating the reflector so that the first laser is irradiated to the target object by passing through the partial surface.

13. The method of claim 9, wherein the receiving of the second laser comprises receiving a laser reflected by the target object using a photodetector.

14. The method of claim 13, wherein the photodetector comprises a p-type semiconductor and an n-type semiconductor.

15. The method of claim 14, wherein the receiving of the laser reflected by the target object using the photodetector comprises detecting the target object using a built-in potential barrier formed at a p-n junction between the p-type semiconductor and the n-type semiconductor.

16. A system of detecting an object using a laser, the system comprising:

the laser scanner of claim 1; and a controller, wherein the controller comprises:

a non-transitory memory configured to store instructions; and a processor electrically connected to the memory and configured to execute the instructions, and wherein, when the instructions are executed by the processor, the processor is configured to control the laser scanner.

* * * * *